United States Patent
Hwang et al.

(10) Patent No.: US 8,295,846 B2
(45) Date of Patent: Oct. 23, 2012

(54) GPS-BASED CE DEVICE WIRELESS ACCESS POINT MAPPING

(75) Inventors: Paul Jin Hwang, San Diego, CA (US);
Fredrik Carpio, San Diego, CA (US);
Nikolaos Georgis, San Diego, CA (US);
Benjamin Lo, San Diego, CA (US)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 12/715,525

(22) Filed: Mar. 2, 2010

(65) Prior Publication Data

US 2011/0215969 A1 Sep. 8, 2011

(51) Int. Cl.
*H04W 40/00* (2009.01)
(52) U.S. Cl. ........................................... 455/446
(58) Field of Classification Search .................. 455/446; 342/451
See application file for complete search history.

(56) References Cited

U.S. PATENT DOCUMENTS

| | | | |
|---|---|---|---|
| 7,420,510 B2 | 9/2008 | Kolavennu et al. | |
| 7,835,749 B1 * | 11/2010 | Hart et al. | 455/446 |
| 2002/0075825 A1 * | 6/2002 | Hills et al. | 370/329 |
| 2005/0059406 A1 | 3/2005 | Thomson et al. | |
| 2005/0245252 A1 * | 11/2005 | Kappes et al. | 455/446 |
| 2005/0272440 A1 * | 12/2005 | Li | 455/456.1 |
| 2006/0072760 A1 * | 4/2006 | Gates | 380/270 |
| 2008/0182584 A1 | 7/2008 | Le | |
| 2008/0211778 A1 | 9/2008 | Ording et al. | |
| 2009/0042561 A1 * | 2/2009 | Jackson | 455/426.1 |
| 2009/0174680 A1 | 7/2009 | Anzures et al. | |
| 2010/0070256 A1 * | 3/2010 | Nilsson et al. | 703/13 |
| 2011/0018761 A1 * | 1/2011 | Walley et al. | 342/357.28 |

FOREIGN PATENT DOCUMENTS

WO  WO 2008/056850 A2 *  5/2008

OTHER PUBLICATIONS

Wireless dead zone problem, DSLReports.com, http://www.dslreports.com/forum/r6913737-Wireless-dead-zone-problem, May 2003.*
G. Ou, Securing the Wireless LAN, http://www.lanarchitect.net/Examples/SecureWLAN.ppt, Oct. 2007.*
NetSpot 1.1.284, http://www.macworld.com/article/1163892/netspot_helps_you_optimize_your_wi_fi_networks.html, Nov. 2011.*
Wireless LAN Architectures, LXE, date unknown.*
A.R. Sandeep, Y. Shreyas, Shivam Seth, Rajat Argarwal, G. Sadashivappa; "Wireless Netowrk Visualization and Indoor Empirical Propagation Model for a Campus Wi-Fi Network", http://www.waset.org/journals/vaset/v42/v42-135.pdf, 2008.
Junfang Wang, Bin Xie, Kan Cai, Agrawal, D.P.; "Efficient Mesh Router Placement in Wireless Mesh Networks" http://ieeexplore.ieee.org/xpl/freeabs_all.jsp?arnumber=4428616, 2007, (abstract only).

(Continued)

*Primary Examiner* — Jack W Keith
*Assistant Examiner* — Fred H Mull
(74) *Attorney, Agent, or Firm* — John L. Rogitz

(57) ABSTRACT

A CE device can incorporate a GPS receiver and can be moved around a building with wireless access point (AP) signal strengths recorded at various locations. The optimum AP location is selected on the basis of the location-to-signal strength correlations.

16 Claims, 3 Drawing Sheets

OTHER PUBLICATIONS

S. Kouhbor, University of Ballarat; Julien Ugon, University of Ballarat; Alex Kruger, University of Ballarat; Alex Rubinov, University of Ballarat; "Optimal Placement of Access Point in WLAN Based on New Algorithm" http://www.computer.org/portal/web/csdl/doi/10.1109/CMB.2005.75.2005, (abstract only).

Leslie A. Lenert, Douglas A. Flamer, Theodore C. Chan, Ramesh Rao; "An Intelligent 602.11 Triage for Medical Response to Disasters", http://www.nobi.nlm.nih.govipmo/articles/PMC1560742/.

James R. Milne, Kirstin Conners, Trisha Yasuhara, co-pending application "Accelerometer-Based CE Device Wireless Access Point Mapping"—200902876.01 (1168.425), U.S. Appl. No. 12/705,173, filed Feb. 13, 2010.

James R. Milne, Kirstin Conners, Tisha Yasuhara, "Accelerometer-Based Tapping User Interface" co-pending U.S. Appl. No. 12/705,106, filed Feb. 12, 2010.

James R. Milne, Kirstin Conners, Trisha Yasuhara, "Accelerometer-Based Touchscreen User Interface" co-pending U.S. Appl. 12/698,507, filed Feb. 2, 2010.

Hiroya Fujii, Isamu Arie, Ronald Clark, Justin Jakobson, Yuji Oikawa, Jow Wada, Rui Yamagami, Takuo Ikeda, Chia-Yao Lin, Junghee Yeo, "Digital Clock with Internet Connectivity and Multiple Resting Orientations" co-pending U.S. Appl. No. 12/820,458, filed Jun. 22, 2010.

Silver Pac, "Silver PAC Evolution 5500 Remote Would Have Been Great 3 Year Ago", Dec. 14, 2009; http://gizmodo.com/5426322/silver-pac-evolution-5500-remote-would-have-been-great-3-year-ago.

"The chumby one—a new faster, cheaper chumby", Nov. 16, 2009; http///www.krunker.com/2009/11/16/the-chumby-one-a-new-faster-cheaper-chumby/.

RAD1ONOW, "Intergreated DAB, wi-fi, Twitter and Facebook? It makes Pure Sensia", Sep. 21, 2009; http://www.radio-now.com.uk/pure-sensia-wifi-radio.htm.

Kristofer Brozio, "Sungale ID800WT 8 Inch Wi-Fi Digital Touchscreen Photo Frame", Jun. 30, 2009; http://www.testfreaks.com/blog/reviews/sungale-id800wt-8-inch-wi-fi-digital-touchscreen-photo-frame/.

Axiss Technology Corporation, Taiwan, "WiFi Digital Photo Frame", http://tsyannawu.trustpass.alibaba.com/product/104940461-101256632/8_Inch-Digital_Photo_Frame.html.

* cited by examiner

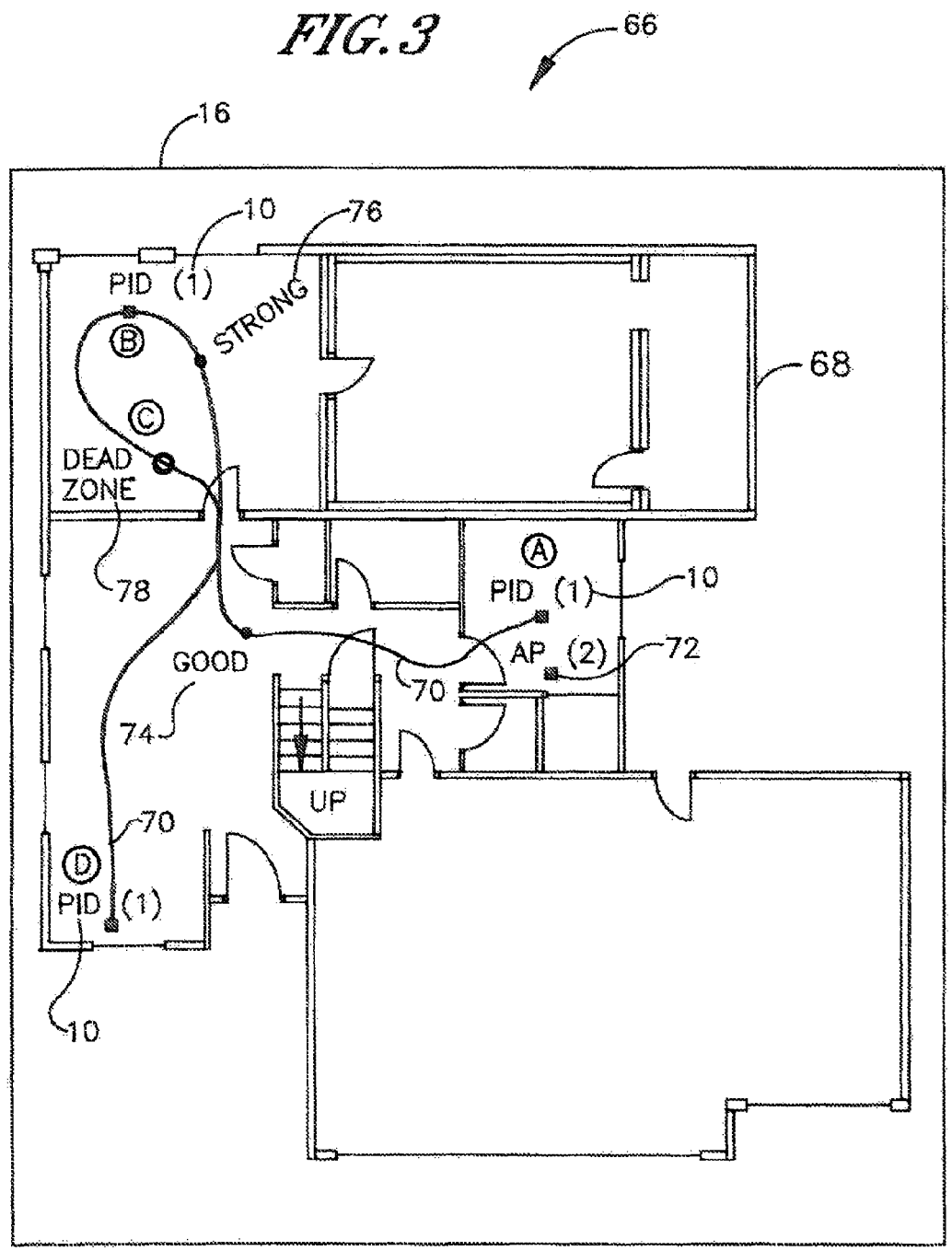

US 8,295,846 B2

GPS-BASED CE DEVICE WIRELESS ACCESS POINT MAPPING

FIELD OF INVENTION

The present application is directed to using global positioning satellite (GPS) signals to map optimal wireless access point (AP) coverage for a CE device.

BACKGROUND OF THE INVENTION

A wide variety of CE devices such as wireless telephones, personal digital assistants (PDAs), laptop computers, etc. have been provided that leverage digital processing to provide a multiplicity of useful features to users. Such devices typically connect to wide area networks such as the Internet and many such devices do so using wireless links. When wireless links are used, the CE device ordinarily communicates with a so-called wireless "access point" (AP), essentially a wireless transceiver, which in turn is connected via a wired path to the Internet.

As understood herein, use of a CE device's wireless network connectivity can be limited in a business or home environment depending on the wireless Internet coverage. A CE device cannot be used to access a network in areas where it inadequately receives signals from the wireless AP. This problem may be addressed by improving the wireless range of the AP and/or CE device but as understood herein, power consumption concerns counterbalance this approach. Or, wireless repeaters may be added, e.g., inside a home to improve connectivity with the AP, but as recognized herein use of such repeaters cascades costs. In such cases, however, a user typically has little good idea where to locate a repeater.

SUMMARY OF THE INVENTION

Accordingly, a consumer electronics (CE) device includes a housing bearing a processor and a visual display controlled by the processor. A position sensor is in the housing and generates geographic position signals. Also, a wireless receiver is in the housing and receives signals from a wireless access point (AP) configured to communicate with a wide area network and located at a current AP location. The processor uses the signals from the position sensor and wireless receiver to generate a correlation of wireless access point (AP) communication conditions with respective locations in a building. The processor further presents an indication on the display of a suggested location of the AP that is different from the current AP location.

In some implementations, the processor presents on the display a map illustrating communication conditions as a function of position in the building. The communication condition can include signal strength (SS).

The suggested location of the AP can be a location with a highest communication condition, or a location that is geographically between plural positions of equally good communication conditions, or a furthest location from the current AP location having a corresponding communication condition that meets or exceeds a minimum threshold. Yet again, the suggested location of the AP can be a location having a lowest communication index.

In example embodiments, the device instructs a user to enter locations of wireless AP physical connections to a network, with a respective communication condition being recorded for each wireless AP physical connection location entered. The suggested location of the AP can then be a wireless AP physical connection location with a higher communication index than communication indices associated with other wireless AP physical connection locations.

In other examples, the processor presents on the display a suggested location for disposing a wireless AP repeater communicating wirelessly with the wireless AP. If desired, the processor presents on the display a suggested most secure wireless AP location using the correlation of wireless access point (AP) communication conditions with respective locations.

In another aspect, a method includes receiving, in a computing device, location information indicating location of the device. The method also includes receiving, in the computing device, signals from a wireless access point (AP), moving the computing device relative to the AP, and correlating first and second locations of the computing device to first and second AP communication indices. Based on the correlating act, a suggested location of the AP that is different from a current location of the AP is output.

In another aspect, a system includes a computing device including a position receiver and a wireless transceiver. The system also includes a wireless access point (AP) communicating with the computing device. The computing device determines communication indicia for respective locations of the computing device relative to the AP and based thereon outputs to a user a suggested best AP location, a suggested most secure AP location, and a suggested AP repeater location. The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a schematic plan view illustrating the mapping of AP signal strengths.

DETAILED DESCRIPTION OF THE PREFERRED EMBODIMENT

Figure 1:
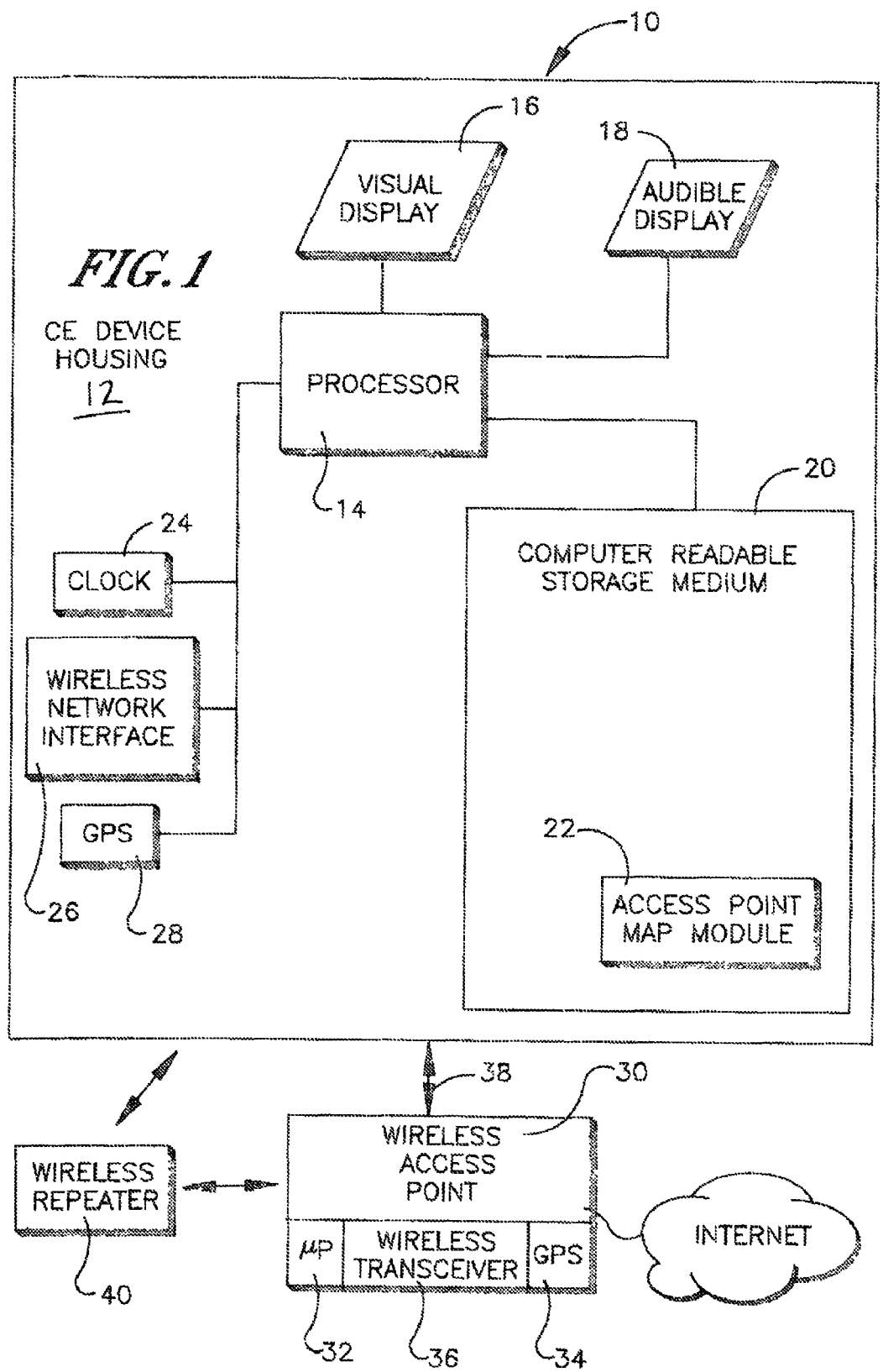
FIG. 1 is a block diagram of an example system in accordance with present principles.

Referring initially to FIG. 1, a CE device 10 is shown that includes a housing 12 bearing a digital processor 14. The CE device 10 may be, e.g., a personal computer (PC) or laptop computer or notebook computer, although other digital processing apparatus are envisioned.

The processor 14 can control a visual display 16 and an audible display 18 such as one or more speakers. The visual display 16 may be, e.g., a capacitive touchscreen display, although other display types may be used.

To undertake present principles, the processor 14 may access one or more computer readable storage media 20 such as but not limited to disk-based or solid state storage. In example non-limiting embodiments, the media 20 may store various software modules, including, for example, a wireless access point (AP) map module 22.

The left portion of FIG. 1 shows that in addition to the processor 14, displays 16, 18, and media 20, the housing 12 may hold a computer clock 24 to output a time of day signal to the processor 14 for, e.g., display of the time on the visual display 16 and for, e.g., the sounding of a time-based alarm on the audible display 18. If desired, a wireless network interface 26 may be in the housing 12 and may communicate with the processor 14 to permit the processor 14 to communicate with a wide area computer network such as the Internet. The interface 26 may be, without limitation, a WiFi interface. A position receiver 28 such as a global positioning satellite (GPS) receiver may be provided in the housing 12 and may communicate signals to the processor 14 representative of the terrestrial position of the housing 12.

As also shown in FIG. 1, the CE device 10 communicates with a wireless access point (AP) 30 including an AP processor 32 receiving position signals from a position receiver 34 and communicating wirelessly with the CE device 10 using a wireless transceiver 36 over a wireless link 38. In cases where the wireless link 38 is insufficient, the CE device 10 may communicate with the AP 30 via a wireless repeater 40. Without limitation, the AP 30 may be implemented by a wireless router.

Figure 2:
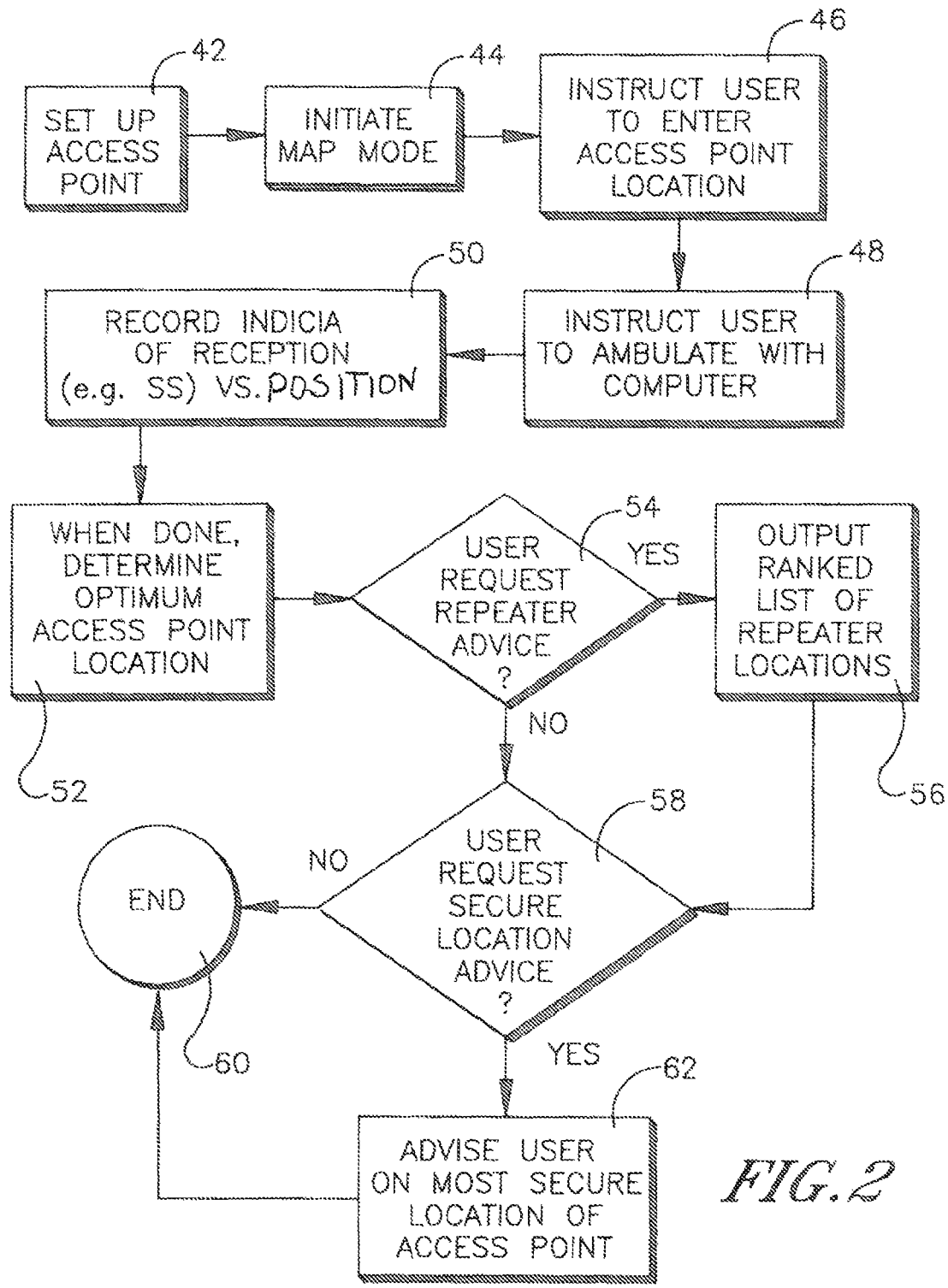
FIG. 2 is a flow chart of example logic for mapping wireless access point (AP) signal strengths.

FIG. 2 shows example logic in accordance with present principles. Commencing at block 42 the user sets up the AP 30 in a convenient part of a dwelling such as a home, e.g. nearby a telephone jack for connecting the AP to the wireless telephony network (and, hence, the Internet). At block 44 the map module 22 may then be invoked on the device 10 from, e.g., a setup screen or other location.

Proceeding to block 46, the device 10 executing the map module 22 instructs the user to enter the location of the AP by, e.g., standing next to the AP and inputting an "enter" signal using a keypad or point-and-click device associated with device 10. This signals the device 10 to record the position indicated by the position receiver 28 as the AP position. The instruction to enter the AP position may be presented on the visual display 16 and/or audible display 18.

Then, at block 48 the device 10 executing the map module 22 instructs the user to ambulate around the dwelling in which the AP is located, recording, as the user does so, indicia of signal reception from the AP at the device 10 at block 50. One or more indicia of AP communication conditions may be used, such as signal strength (SS) or signal-to-noise ratio (SNR) or bit error rate (BER) or other parameter or parameters. The one or more indicia are recorded on the medium 20 and correlated to the position indicated by the position sensor 28 at the time a signal characterized by the indicia is received. In this way, a map (which may be implemented on the medium 20 in any suitable format such as a table) is generated that correlates various geographic positions of the device 10 to respective AP communication conditions, e.g., to SS.

After creating this signal strength map, the device 10 executing the map module 22 can determine an optimum AP location using the map at block 52. In one implementation, the location with the highest communication index is selected. In another implementation, the location that is geographically between plural positions of equally good communication indices is selected. In another implementation, the furthest location from the AP position recorded at block 46 whose corresponding communication index meets or exceeds a minimum threshold is selected. In another implementation, the location having the lowest communication index is selected.

Other heuristics may be used. For example, the device 10 executing the map module 22 may instruct the user to enter the locations not just of the initial AP set up but also of the telephone jacks in the dwelling using above principles as the user ambulates with the device 10 at block 48. At each jack location, the communication index is recorded, and the jack location with the highest communication index is selected at block 52.

Regardless of how selected, the device 10 executing the map module 22 can present the "best" location to the user on, e.g., the visual display 16. This may be done by presenting an image of a map on the display and highlighting as in green the "best" location. An example map is further discussed below.

Additionally, if a user requests advice (by, e.g., selecting a user interface element presented on the display 16 indicating "repeater location optimization") at decision diamond 54, repeater location advice can be presented to the user on the display 16 and/or 18 at block 56. In one example, the repeater location advice may be a ranked list of locations, e.g., an image of the map discussed below, with position rankings indicated alpha-numerically and/or by color. The order of the list may be established to be: location with lowest communication index first, location with second-lowest communication index second, and so on.

Moreover, a user may be enabled to select, at decision diamond 58, whether to be provided secure location advice. Selection of this option may be effected by selecting a user interface element presented on the display 16 indicating "show me the most secure AP location". At block 62 a secure location may be presented to the user by, e.g., presenting the map and showing a color-coded or alpha-numerically designated "secure" location on the display 16. In one example, the secure location output at block 62 is the map location with the lowest corresponding communication index. The process ends at state 60.

Other potential uses of above principles are to create a service in which technicians execute the logic of FIG. 2 on the behalf of a customer.

FIG. 3 illustrates a map 66 that may be presented on the visual display 16 in accordance with above principles. The map 66 may include wall and door boundaries 68 derived from a computer-stored floor plan of the user's home that is downloaded via, e.g., the network interface 26 and stored on the media 20, although in some embodiments no boundaries 68 need be presented.

In FIG. 3, "PID (1)" represents the CE device 10, and a track 70 representing the user's movement at blocks 48 and 50 in FIG. 2 may be presented on the map. The map can present an image or icon 72 of the wireless AP at the position indicated by the user to be the origin of the map. Indications of AP SS can be presented on the track 70 as recorded at block 50 for various locations on the track. The indications may be color coded (e.g., green for "good", orange for "marginal", red for "poor") or, as shown at 74, 76, and 78 in FIG. 3, may be textual, e.g., "good", "strong", and "dead zone", respectively.

While the particular GPS-BASED CE DEVICE WIRELESS ACCESS POINT MAPPING is herein shown and described in detail, it is to be understood that the subject matter which is encompassed by the present invention is limited only by the claims.

What is claimed is:

1. Consumer electronics (CE) device comprising:
   housing bearing a processor and a visual display, the processor controlling the display;
   position sensor in the housing and generating geographic position signals;
   wireless receiver in the housing and receiving signals from a wireless access point (AP) configured to communicate with a wide area network and located at a current AP location;
   the processor using the signals from the position sensor and wireless receiver to generate a correlation of wireless access point (AP) communication conditions with respective locations in a building, the processor presenting an indication on the display of a suggested location of the AP that is different from the current AP location, wherein the suggested location of the AP is a location that is geographically between plural positions of equally good communication conditions, or wherein the suggested location of the AP is a furthest location from the current AP location having a corresponding communication condition that meets or exceeds a minimum threshold, wherein the processor presents on the display a map illustrating communication conditions as a function of position in the building.

2. The CE device of claim 1, wherein the suggested location of the AP is a location with a highest communication condition.

3. The CE device of claim 1, wherein the device instructs a user to enter locations of wireless AP physical connections to a network, a respective communication condition being recorded for each wireless AP physical connection location entered, the suggested location of the AP being a wireless AP physical connection location with a higher communication index than communication indices associated with other wireless AP physical connection locations.

4. The CE device of claim 1, wherein the processor presents on the display a suggested location for disposing a wireless AP repeater communicating wirelessly with the wireless AP.

5. The CE device of claim 1, wherein the processor presents on the display a suggested most secure wireless AP location using the correlation of wireless access point (AP) communication conditions with respective locations.

6. Consumer electronics (CE) device comprising:
housing bearing a processor and a visual display, the processor controlling the display;
position sensor in the housing and generating geographic position signals;
wireless receiver in the housing and receiving signals from a wireless access point (AP) configured to communicate with a wide area network and located at a current AP location;
the processor using the signals from the position sensor and wireless receiver to generate a correlation of wireless access point (AP) communication conditions with respective locations in a building, the processor presenting an indication on the display of a suggested location of the AP that is different from the current AP location, wherein the suggested location of the AP is a location that is geographically between plural positions of equally good communication conditions, or wherein the suggested location of the AP is a furthest location from the current AP location having a corresponding communication condition that meets or exceeds a minimum threshold, wherein the communication condition includes signal strength (SS).

7. Consumer electronics (CE) device comprising:
housing bearing a processor and a visual display, the processor controlling the display;
position sensor in the housing and generating geographic position signals;
wireless receiver in the housing and receiving signals from a wireless access point (AP) configured to communicate with a wide area network and located at a current AP location;
the processor using the signals from the position sensor and wireless receiver to generate a correlation of wireless access point (AP) communication conditions with respective locations in a building, the processor presenting an indication on the display of a suggested location of the AP that is different from the current AP location, wherein the suggested location of the AP is a location that is geographically between plural positions of equally good communication conditions, or wherein the suggested location of the AP is a furthest location from the current AP location having a corresponding communication condition that meets or exceeds a minimum threshold wherein the suggested location of the AP is a location having a lowest communication index.

8. Method comprising:
receiving, in a computing device, location information indicating location of the device;
receiving, in the computing device, signals from a wireless access point (AP);
moving the computing device relative to the AP;
correlating at least first and second locations of the computing device to first and second AP communication indices; and
based on the correlating act, outputting a suggested location of the AP that is different from a current location of the AP, further comprising presenting a map on the device showing the first and second locations along with the first and second AP communication indices.

9. The method of claim 8, wherein the suggested location of the AP is a location with a highest communication condition.

10. The method of claim 8, comprising instructing a user to enter locations of wireless AP physical connections to a network, recording a respective communication condition for each wireless AP physical connection location entered, the suggested location of the AP being a wireless AP physical connection location with a higher communication index than communication indices associated with other wireless AP physical connection locations.

11. The method of claim 8, comprising presenting a suggested location for disposing a wireless AP repeater communicating wirelessly with the wireless AP.

12. The method of claim 8, comprising presenting a suggested most secure wireless AP location using a correlation of wireless access point (AP) communication conditions with respective locations.

13. Method comprising:
receiving, in a computing device, location information indicating location of the device;
receiving, in the computing device, signals from a wireless access point (AP);
moving the computing device relative to the AP;
correlating at least first and second locations of the computing device to first and second AP communication indices; and
based on the correlating act, outputting a suggested location of the AP that is different from a current location of the AP, wherein the suggested location of the AP is a location that is geographically between plural positions of equally good communication conditions.

14. Method comprising:
receiving, in a computing device, location information indicating location of the device;
receiving, in the computing device, signals from a wireless access point (AP);
moving the computing device relative to the AP;
correlating at least first and second locations of the computing device to first and second AP communication indices; and
based on the correlating act, outputting a suggested location of the AP that is different from a current location of the AP, wherein the suggested location of the AP is a furthest location from the current AP location having a corresponding communication condition that meets or exceeds a minimum threshold.

15. Method comprising:

receiving, in a computing device, location information indicating location of the device;

receiving, in the computing device, signals from a wireless access point (AP);

moving the computing device relative to the AP;

correlating at least first and second locations of the computing device to first and second AP communication indices; and based on the correlating act, outputting a suggested location of the AP that is different from a current location of the AP, wherein the suggested location of the AP is a location having a lowest communication index.

16. System comprising:

computing device including a position receiver and a wireless transceiver; and wireless access point (AP) communicating with the computing device, the computing device determining communication indicia for respective locations of the computing device relative to the AP and based thereon outputting to a user a suggested best AP location, a suggested most secure AP location as indicated by a communication index, and a suggested AP repeater location.

* * * * *